United States Patent [19]

Swartz

[11] Patent Number: 4,789,984
[45] Date of Patent: Dec. 6, 1988

[54] HIGH-SPEED MULTIPLEXER CIRCUIT
[75] Inventor: Robert G. Swartz, Tinton Falls, N.J.
[73] Assignee: American Telephone and Telegraph Company, AT&T Bell Laboratories, Murray Hill, N.J.
[21] Appl. No.: 109,122
[22] Filed: Oct. 16, 1987
[51] Int. Cl.[4] ............................................. H04J 3/02
[52] U.S. Cl. .................................... 370/112; 328/104
[58] Field of Search ............... 370/112; 328/104, 105; 307/244, 243

[56] References Cited

U.S. PATENT DOCUMENTS 4,317,198  2/1982  Johnson .............................. 370/112
4,593,390  6/1986  Hildebrand et al. ................ 370/112

OTHER PUBLICATIONS

R. Reimann and H–M. Rein, "THPM 15:1: A Bipolar 4:1 Time Division Multiplexer IC Operating up to 5.5 Gb/s", 1986, *IEEE International Solid–State Circuits Conference*, Digest of Technical Papers, Feb. 20, 1986, pp. 186–187.
H–M. Rein and R. Reimann, "6 Gbit/s Multiplexer and Regenerating Demultiplexer ICs for Optical Transmission Systems Based on a Standard Bipolar Technology", *Electronics Letters*, vol. 22, No. 19, Sep. 11, 1986; pp. 988–990.
K. C. Wang et al., "High-Speed Circuits for Lightwave Communication Systems Implemented with (AlGa)As/GaAs Heterojunction Bipolar Transistors", *IEEE* 1987 *BCTM*, Sep. 21, 1987, pp. 142–145.

Primary Examiner—Douglas W. Olms
Assistant Examiner—Min Jung
Attorney, Agent, or Firm—John A. Caccuro

[57] ABSTRACT

A high data rate multiplexer (MUX) architecture includes front-end and rear-end MUXs clocked at a system clock rate equal to one-half of the MUX output data rate. The front-end MUX selects inputs under control of select signals derived from multiple phases of a select clock. The select clock is derived from the system clock. The number of select signals is equal to the multiplexing factor of the MUX.

13 Claims, 5 Drawing Sheets

|  | 701 | 702 | 703 | 704 | 705 | 706 | --- |
|---|---|---|---|---|---|---|---|
| CHAN 2-A2- OUTPUT | 2-1 |  | 2-1 |  | 2-2 |  | --- |
| CHAN 3-A3- OUTPUT | 3-1 |  | 3-1 |  | 3-2 |  | --- |
| CHAN 4-A4- OUTPUT | 4-1 |  | 4-1 | 4-1 | 4-2 |  | --- |
| B1- OUTPUT |  | 3-1 |  |  |  | 3-2 | --- |
| CHAN 1-C1- OUTPUT | 1-1 |  | 3-1 |  | 1-2 |  | --- |
| C2- OUTPUT |  | 2-1 |  | 4-1 |  | 2-2 | --- |
| MUX OUT-D1- OUTPUT |  | 1-1 | 2-1 | 3-1 | 4-1 | 1-2 | --- |

750 CLOCK

CL1

CL2

$\overline{CL1}$ $\overline{CL2}$

HIGH-SPEED MULTIPLEXER CIRCUIT

RELATED APPLICATION

Related subject matter is disclosed in the following application filed concurrently herewith and assigned to the same Assignee hereof: U.S. patent application Ser. No. 109,009 entitled "A High-Speed Demultiplexer Circuit", inventor R. G. Swartz.

TECHNICAL FIELD

This invention relates to high-speed digital circuits and more particularly to high-speed digital multiplexer circuits.

BACKGROUND OF THE INVENTION

To exploit the high data transmission rate of optical fibers, new circuit technologies and architectures are evolving. Digital communication systems which operate at these higher data rates require multiplexers (MUX) and demultiplexers (DEMUX) which operate in the several giga-bits-per-second (Gb/s) range. To achieve the optimum data speed, circuits must operate at the maximum NRZ (non-return-to-zero) data rate possible for the particular technology.

The effective and practical utilization of a MUX circuit in a communication system requires that a minimum number of adjustable delay lines be utilized. Undesirably, existing MUX circuits require one variable delay line to sync the external clock to the received data and one or more additional variable delay lines to sync the clocking of the various stages of the MUX.

Additionally, the MUX must be able to handle multiple channel data arriving simultaneously at the MUX inputs; otherwise, an additional variable delay line for each channel may be required to properly stagger the data to the MUX. Existing MUX designs have failed to meet all of the above objectives.

SUMMARY OF THE INVENTION

The above objectives are met by a fully synchronous MUX circuit architecture disclosed by the present invention. The MUX architecture provides M:1 multiplexing using a M:2 front-end MUX and a rear-end 2:1 MUX. The front-end MUX selectively enables inputs by using multiple phases of a select clock. The select clock has a frequency equal to 2/M of the frequency of the system clock. According to a key aspect of the present invention, one internal clock signal is used to clock all stages of the MUX circuit, thereby eliminating the need for adjustable delay lines to sync the different clocks utilized in prior art MUX designs.

In one embodiment, a $2^N$:1 ($N \geq 2$) MUX circuit is implemented using $2^N - 1$ interconnected 2:1 MUXs. The $2^N$:1 MUX circuit generates $2^N$ phase select signals having a frequency of $1/2^N - 1$ of the frequency of a system clock signal. The internal system clock signal frequency is equal to one-half of the output data rate. All 2:1 MUXs except the final 2:1 MUX are enabled by at least one of said select signals and clocked using the clock signal. The final 2:1 MUX is clocked by the system clock signal to provide the MUX output at the data rate.

In accordance with another aspect of the present invention, a MUX circuit includes one sampling latch circuit for each MUX input, each latch circuit being clocking by the system clock signal, thereby enabling concurrent sampling of the input data. The MUX circuit includes at least one integral time delay latch connected between the sampling circuit and 2:1 MUX.

Figures 4, 5:
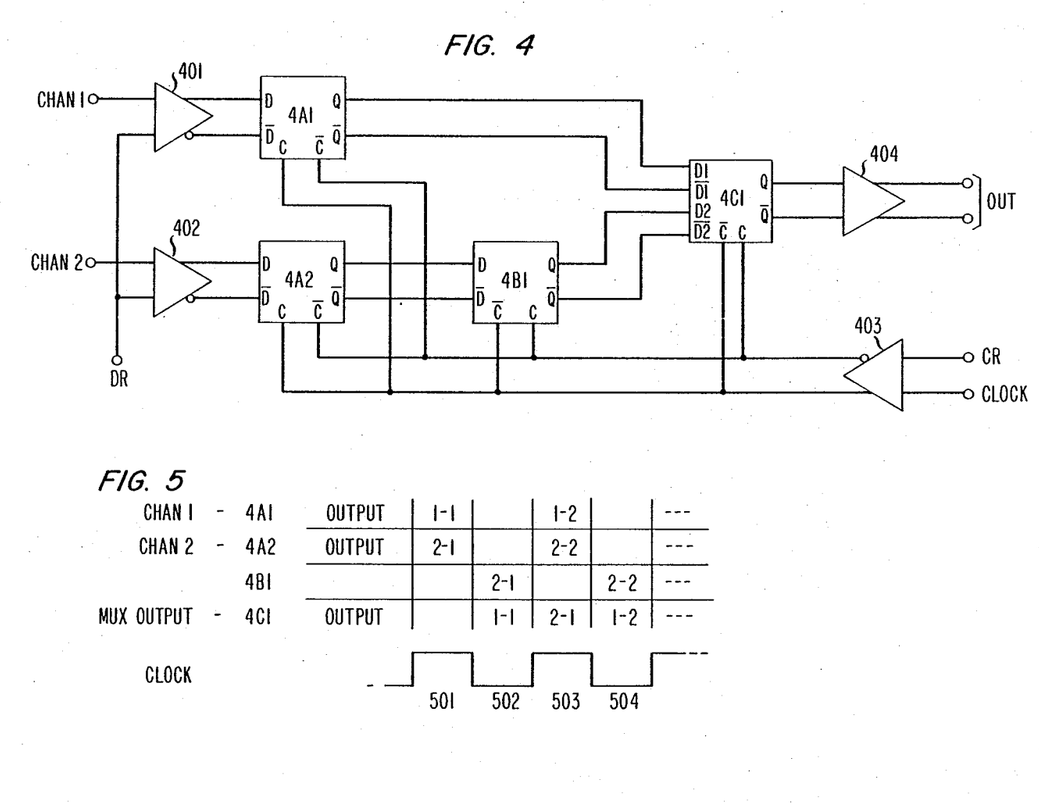
FIG. 4 shows an illustrative embodiment of a 2:1 MUX circuit in accordance with the present invention.
FIG. 5 shows the timing of the internal clock signal, the select signal and the data processing of the 2:1 MUX circuit shown in FIG. 4.

Analogous elements occurring in different figures are generally identified by the same reference designation. An element reference designation beginning with a number indicates the figure in which that element is first illustrated (e.g., 4A1 is shown in FIG. 4).

GENERAL DESCRIPTION

In accordance with the present invention, a MUX architecture is disclosed that operates at the highest data rate possible while satisfying several design constraints. These design constraints may be summarized as follows: Circuits must operate at the maximum NRZ data rate possible within the limits of a particular technology. This data rate is defined to be 1/Td, where Td is the time delay of a single gate under appropriate loading conditions (typically with a fanout of 3 to 4). For example, a technology with a loaded gate delay of 100 ps (pico seconds) is required to be internally capable of NRZ operation at 10 Gb/s. Circuits must function without the need for multiple adjustable delay lines. No more than one variable delay line is permitted (one delay line is used to synchronize the external clock and data). The MUX must be able to handle multiple channel input data arriving simultaneously at the data inputs. This requirement implies that staggering of input data is not permitted for the MUX.

The above requirements provide maximum benefit in communication system applications, where the highest operating speed possible is of paramount concern, and yet numerous user manual adjustments must be avoided because of expense and reliability issues.

The first requirement of maximum operating speed is realized in the present invention by eliminating unclocked logic, by utilizing "biphase" architectures, and by employing the ECL (emitter coupled logic) latch configurations and related "muxlatch" and "freeze latch" to accomplish required logic functions.

The present design avoids unclocked logic by synchronizing all circuits utilized in the MUX, i.e., there is no intervening unclocked logic between adjacent clocked logic stages. The biphase architecture which clocks logic circuits on both phases of a clock signal is used to approximately double the operating speed over conventional approaches.

Figure 1:
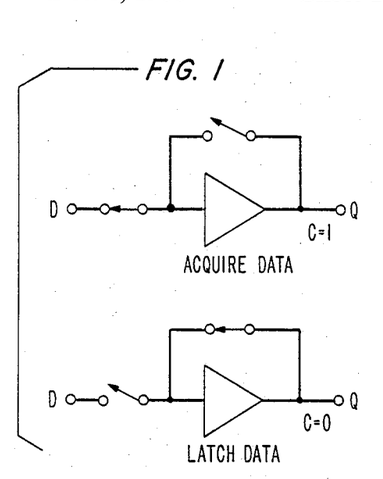
FIG. 1 shows a symbolic latch useful in understanding basic latch operations.

A conventional ECL (emitter coupled logic) latch, as symbolically shown in FIG. 1, operates in two modes:

acquire and latch. In the acquire mode (clock=1), the latch operates as a simple differential amplifier, transferring the data from the input D to the output Q. In this mode of operation, the latch senses the input data value (1 or 0). In the latch mode (clock=0), the output Q stabilizes at some particular logic level, the latch being internally disconnected from the data input. The particular mode of operation is determined by the phase of the clock, and the particular logic level at which the output stabilizes is determined by the input data level present when the clock transitions between the acquire (C=1) and latch (C=0) modes.

Thus, for one-half of the clock cycle (C=0), the data input is ignored in the conventional approach. The biphase architecture utilizes this otherwise wasted time by using two or more latches operating in parallel so that while one latch is acquiring, another parallel circuit is latching. Thus the data is being sampled at all times by one or another circuit, and there is no wasted time. The data throughput effectively doubles. One characteristic of using the biphase circuit approach is that the clocking frequency is equal to one-half the data throughput rate.

The ECL latch, and variations referred to herein as the muxlatch (M-latch) and the freeze latch (F-latch), are the basic building blocks utilized in the disclosed MUX architecture. The M- and F-latches, shown in FIGS. 2 and 3 respectively, consist of an ECL latch with an added level of series gating. With this added series gating (QS1, QS2), the M-latch (FIG. 2) functions as a clocked 2:1 multiplexer with data selection controlled by "select" inputs (S,$\bar{S}$). The F-latch (FIG. 3) is similar to a standard ECL latch, except that the "select" inputs (S,$\bar{S}$) in this case and added series gating (QS1, QS2) gates the clock. The operation of the M- and F-latch configurations introduce only a single gate delay (Td) between logic input and output.

We note that the disclosed logic configuration and other logic configurations may be implemented in silicon bipolar technology or FET technology (e.g., "CML" current-mode logic), as well as non-silicon technologies (for example, gallium arsenide FET or bipolar), can have similar single-gate-delay characteristics, and are well-suited for the architectures disclosed here. The ECL configurations described herein are only example implementations.

Other circuit families utilizing multiple gate-delay logic will also benefit from these architectures, although such logic will not yield the best performance in comparison with single-gate-delay logic.

Regarding the second constraint, in the prior art the need for multiple adjustable delay lines within a MUX circuit arose because of the conventional design practice of utilizing different frequency clocks for different parts of the circuit. This results in a need for delay lines to synchronize these clocks. The use of different frequency clocks within the circuit is understandable since, in a MUX configuration, the input and output data rates are different.

The present invention synchronizes all parts of the MUX circuit by using the same system clock frequency, chosen to be equal to one-half the output data rate. By using only a single clock frequency for the entire circuit, all elements of the circuit are inherently synchronized, and any need for additional adjustable delays is circumvented.

Data staggering is required within the MUX to provide certain required circuit functions. This is accomplished by introducing multiple phases of the system clock. The number of the phases is equal to the multiplexing factor or order of the MUX (for example, 4:1 MUX will have four clock phases). Two useful phases are automatically provided in a biphase circuit: the clock and its inverse. In a differential logic configuration such as ECL, the inverse output is always available, and both clock phases are fully synchronous and undelayed.

The phase spacing is 360/N degrees where N is the order of the MUX. Additional phases beyond the first two clock phases are produced using conventional synchronous divider circuits (master/slave flipflops). For a 2:1 multiplexer, only two clock phases are required. In the case of higher order MUXs, however, multiple additional clock phases are used to handle data switching throughout the circuit. These phases are generated by gating the clock with lower frequency signals produced by digitally dividing down the system clock. The M-latch and the F-latch, with their inherent series gating of the clock, are used for this purpose. The F-latch has a very short data acquisition window (produced by logically "and"ing the clock and select lines) and a very long, stable latched state, which facilitate interfacing the input stages to the remainder of the MUX circuit.

We note that in the case of the general non-binary M:1 MUX, where M≠$2^N$(N integer), additional phases may be required. These can be realized by the addition of 1 or more extra levels of series gating to the M and F latches.

Finally, the third requirement is met by including additional time delay latches as needed into the data path so that data is acquired at the input(s) at the proper time and shifted to the output(s) at the proper time, with simultaneity provided as required.

DETAILED DESCRIPTION

Figure 2:
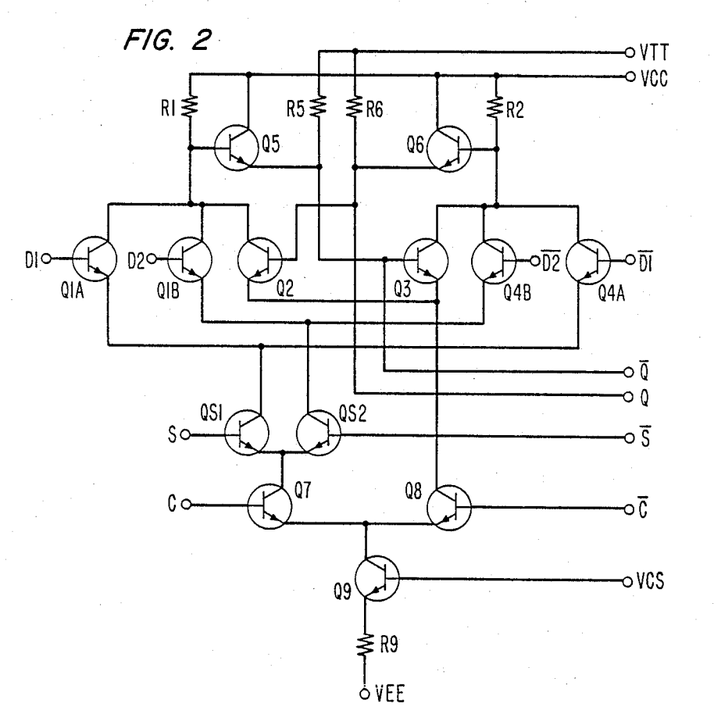
FIG. 2 shows a multiplexer latch (M-latch) which is one of the building blocks used in the present invention.

With reference to FIG. 2, the operation of an M-latch is described. The M-latch is a fully differential ECL circuit with complementary clock (C and $\bar{C}$), select signal (S and $\bar{S}$), data inputs (D1,D2 and $\overline{D1},\overline{D2}$), and buffered outputs (Q,$\bar{Q}$).

The circuit comprising R1, Q5 and R5 when biased by VTT and VCC provides an emitter follower coupling circuit between the collector node of transistors Q1A, Q1B and Q2 and the base of transistor Q3. Similarly, R2, Q6 and R6 when biased by VTT and VCC provide an emitter follower coupling circuit between the collector node of transistors Q4A, Q4B and Q3 and the base of the transistor Q2. R1 and R2 are the gain setting resistors. R5 and R6 act as pull-down resistors to bias emitter follower buffers Q5 and Q6. VTT is an optional supply intended to reduce total power dissipation, with VEE<VTT<VCC. Transistor Q9 and resistor R9 when biased by VCS and VEE provide a bias current source to the latch.

In operation, the select input (S and $\bar{S}$) provides a data selection (MUX) function using transistor QS1 and QS2 for selecting, respectively, inputs D1, $\overline{D1}$ when S=1, $\bar{S}$=0 and inputs D2,$\overline{D2}$ when S=0, $\bar{S}$=1. When the select signal is high (S=1, $\bar{S}$=0) and clock is high (C=1, $\bar{C}$=0), transistors Q7, QS1 are on, thus enabling differential pair Q1A and Q4A. This is the "acquire" D1 phase; the Q and $\bar{Q}$ outputs assume the value of the D1 and $\overline{D1}$ inputs, respectively. Note, when the clock input goes low (C=0, $\bar{C}$=1), Q1A and Q4A are disabled, and differential pair Q2,Q3 are enabled, thus latching the Q and $\bar{Q}$ outputs, isolating them from subsequent changes in the D1 and $\overline{D1}$ data inputs. The Q and $\overline{Q}$ outputs are stable only during this, the "latch", phase of the clock. Note, in accordance with one aspect of the present invention, the select signals S and $\overline{S}$ are stable during clock state transitions between C=1 and C=0.

Similarly, when select signal is low (S=0, $\overline{S}$=1) and clock is high (C=1, $\overline{C}$=0), transistors Q7,QS2 are on, thus enabling differential pair Q1B and Q4B. This is the acquire D2 phase when the Q and $\overline{Q}$ outputs assume the value of the D2 and $\overline{D2}$ inputs, respectively. When the clock goes low (C=0, $\overline{C}$=1), Q1B and Q4B are disabled, and differential pair Q2, Q3 are enabled, thus latching the Q and $\overline{Q}$ outputs.

A D-latch (D-type flipflop), not illustrated, includes all of the circuitry of the M-latch except for transistors QS1, QS2, Q1B and Q4B. The D-latch has inputs D,$\overline{D}$; clock leads C,$\overline{C}$; and outputs Q,$\overline{Q}$ and operates in the manner as described above if we assume that the select signal is high (S=1, $\overline{S}$=0).

Figure 3:
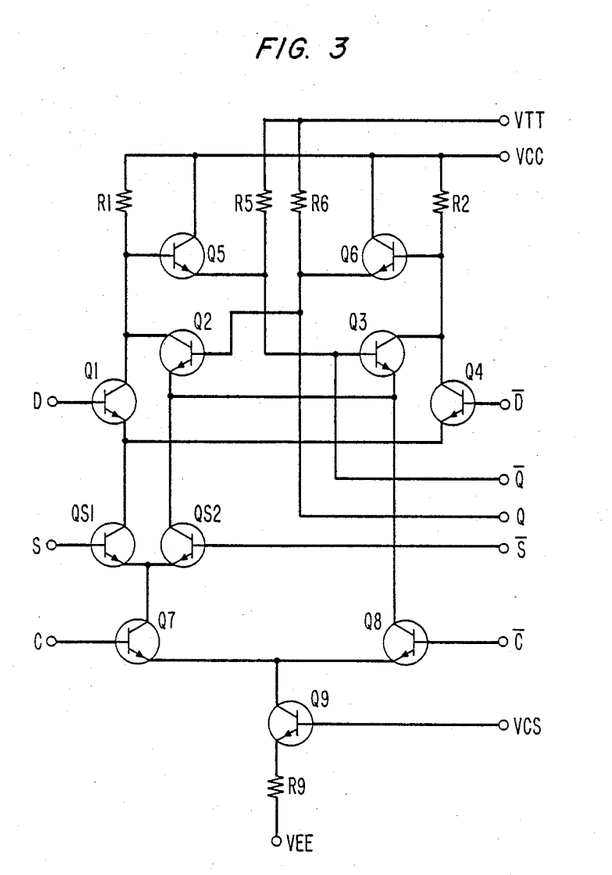
FIG. 3 shows a freeze latch (F-latch) which is one of the building blocks used in the present invention.

With reference to FIG. 3, the operation of an F-latch is described. The F-latch is a fully differential ECL circuit with complementary clock (C and $\overline{C}$), select signal (S and $\overline{S}$), data inputs (D,$\overline{D}$) and outputs (Q,$\overline{Q}$).

The F-latch is a version of the M-latch of FIG. 2 where the second set of data inputs (i.e., Q1B and Q4B) has been merged with the differential latching pair Q2,Q3. Thus the D,$\overline{D}$ inputs are active only when the clock and the select inputs are high (C=1, S=1, $\overline{C}$=0, $\overline{S}$=0). Thus, the D,$\overline{D}$ inputs are disconnected from the latch when either the clock or select inputs are low (i.e., C=0, $\overline{C}$=1, or S=0, $\overline{S}$=1). The F-latch is named for the fact that the internal logic state is "frozen" regardless of the clock phase (C,$\overline{C}$) when the select input is low (S=0, $\overline{S}$=1). This circuit saves a few transistors over the M-latch in certain multiplexer situations.

The buffers utilized in the present invention are well-known ECL-type drivers with emitter follower output (not shown).

The above latches and buffers may be designed using any well-known integrated bipolar or FET circuit technologies or using the more sophisticated technologies such as gallium arsenide (GaAs)MOSFET, bipolar or super self-aligned silicon bipolar. As described in a prior paragraph the disclosed logic configurations may be implemented in silicon bipolar technology or FET technology as well as non-silicon technologies, such as gallium arsenide FET or bipolar.

With reference to FIGS. 4 and 5, the operation of a 2:1 MUX in accordance with the present invention is described. Buffers 401, 402 receive channel 1 and 2 data signals from other apparatus and convert them into a differential data signal. Signal DR establishes the threshold for buffers 401, 402. Buffers 401,402 may also provide other signal conditioning functions (e.g., filtering, level shifting, etc.) to the signals received on channels 1 and 2. These buffers 401,402 may also be part of circuitry external to the multiplexer. Similarly, buffer 403 receives a differential clock signal from the input clock using clock reference CR. Buffer 404 is a differential output buffer for the MUX. Similarly, buffer 404 may provide other signal conditioning functions to interface the multiplexer to external apparatus.

Latches 4A1 and 4A2 are D-latches which operate as an input data sampler. Latch 4B1 is a D-latch which samples the output of 4A2. Latch 4C1 is a 2:1 multiplexer formed from a D-latch by bringing out the base leads of Q2 and Q3 (D2,$\overline{D2}$). With reference to FIG. 5, the progression of data from channels 1 and 2 are illustrated as is clocks through the D-latches 4A1, 4A2, 4B1 and MUX 4C1. Consecutive data bits on channel 1 are designated 1-1, 1-2, 1-3, etc. and consecutive data bits for channel 2 are 2-1, 2-2, 2-3, etc.

Latches 4A1 and 4A2 are clocked in phase when clock is high (C=1, $\overline{C}$=0) to simultaneously sample or acquire new input data from channels 1 and 2. This is shown at time 501 of FIG. 5 which shows the first data bit of channel 1 (1-1) at the output of 4A1 and the first data bit of channel 2 (2-1) at the output of 4A2. These data are latched in 4A1, 4A2 at time 502 when the clock goes low (C=0, $\overline{C}$=1). When the clock goes low (C=0, $\overline{C}$=1), MUX 4C1 acquires bit 1-1 from latch 4A1 and latch 4B1 acquires bit 2-1 from latch 4A2. Thus, channel 2 data is delayed one clock phase by 4B1 which is clocked 180 degrees out of phase with 4A2. Latch 4B1 performs the function of staggering the channel 2 data relative to that of channel 1. In operation, then, MUX 4C1 acquires and outputs channel 1 data from 4A1 while 4B1 is acquiring channel 2 data from 4A2. At time 503, latch 4B1 latches and MUX 4C1 acquires and outputs the now stable channel 2 data (2-1). Meanwhile, 4A1 and 4A2 are acquiring new channel 1 data (1-2) and new channel 2 data (2-2), respectively. At time 504, MUX 4C1 acquires and outputs channel 1 data (1-2) and latch 4B1 acquires channel 2 data (2-2). Thus, the output of the 2:1 MUX alternately outputs data from channels 1 and 2 (e.g., 1-1, 2-1; 1-2, 2-2; etc.). Note that the effective data rate is twice the clock frequency, and therefore the maximum data rate should be considerably faster than the maximum latch frequency.

Figure 6:
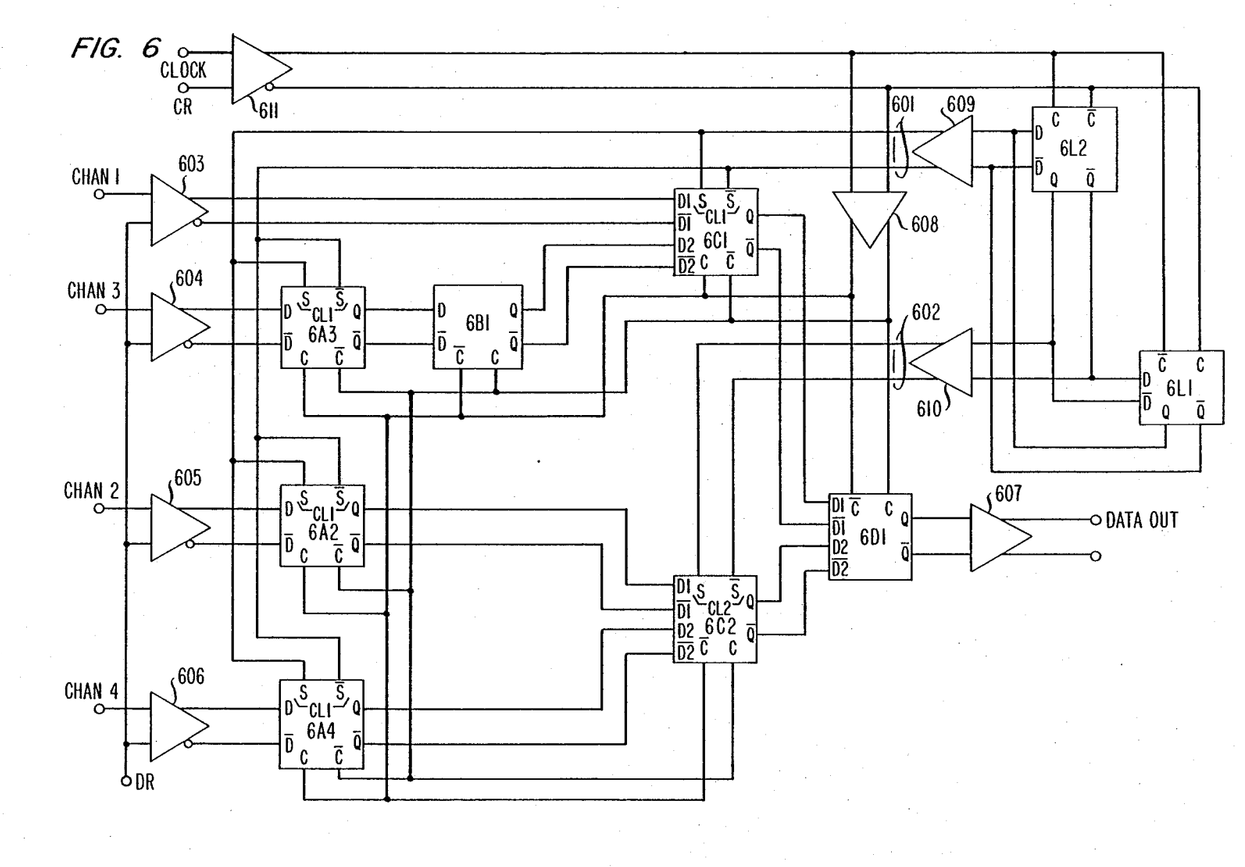
FIG. 6 shows an illustrative embodiment of a 4:1 MUX in accordance with the present invention.
Figure 7:
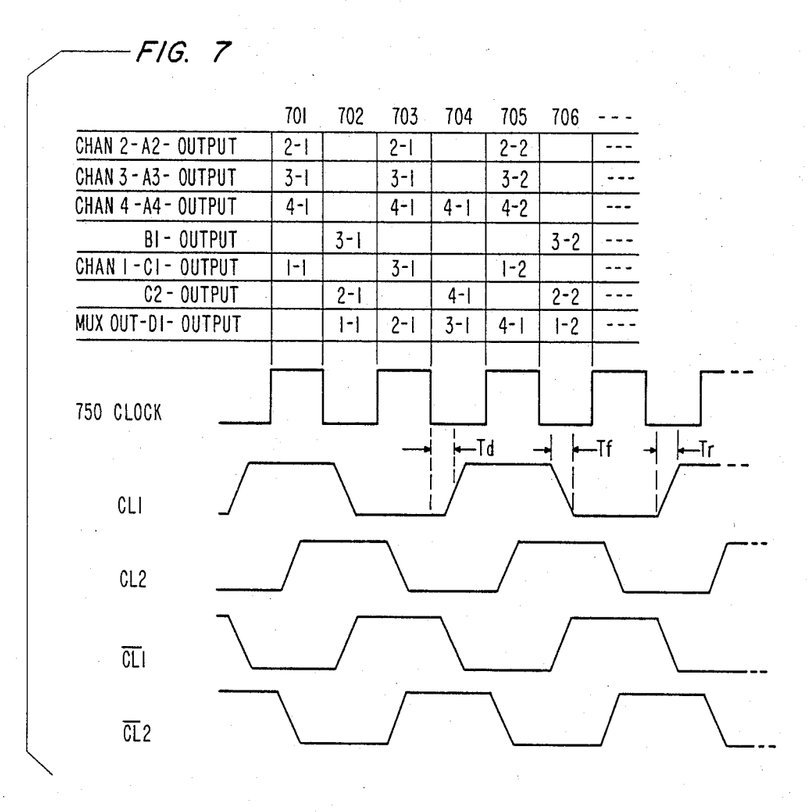
FIG. 7 shows the timing of the input clock signal, the multiple phased select signals and the data processing of the 4:1 MUX circuit shown in FIG. 6.

With reference to FIGS. 6 and 7, the operation of a 4:1 MUX is described. The design of the 4:1 MUX takes advantage of the modularity of the present design and basically utilizes three 2:1 MUXs and additional select signal generation circuitry to implement a 4:1 MUX. Where possible, circuit optimization has resulted in the elimination of unneeded latches to implement a 4:1 MUX.

Buffers 603–606 receive channel 1–4 data signals from other apparatus and convert them into a differential data signal. Signal DR establishes the threshold for buffers 603–606. Buffers 603–606 may also provide other signal conditioning functions (e.g., filtering, level shifting, etc.) to the signals received on channels 1–4. These buffers 603–606 may also be part of circuitry external to the multiplexer. Similarly, buffer 611 generates a differential clock signal from the input clock using clock reference CR. Buffer 607 is a differential output buffer for the MUX. Similarly, buffer 607 may provide other signal conditioning functions to interface the multiplexer to external apparatus. Buffers 608, 609 and 610 provide internal signal buffering.

The 4:1 multiplexer satisfies all of the previous enumerated system requirements. It consists of three D-latches (6B1, 6L1, 6L2), two M-latches (6C1, 6C2), three F-latches (6A2, 6A3, 6A4) and one MUX (6D1).

D-latches 6L1 and 6L2 form a divide-by-two circuit (essentially a master-slave D-type flipflop) that yields differential select clock signals (601, 602) operating at half the system clock frequency (clock). Shown in FIG. 7 is the system clock 750 and the four select signals which are derived from the select clock signals CL1 and CL2 and their complements $\overline{CL1}$ and $\overline{CL2}$. Note that there is 90 degree phase variation between select signals CL1, CL2, $\overline{CL1}$, and $\overline{CL2}$. These select signals CL1, CL2, $\overline{CL1}$, and $\overline{CL2}$ are actually four phases of the select clock. The times Td, Tf, Tr represent respectively the delay, fall and rise time of the latches L1 and L2. Because $\overline{Td}$, Tf, $\overline{Tr}$ are non-zero, the select signals CL1, CL2, $\overline{CL1}$, and $\overline{CL2}$ are delayed relative to the clock, and have non-zero transition times.

An important aspect of the present invention is that the delay through buffers 609 and 610 is unavoidably non-zero, and must be matched (and balanced), therefore, by the delay through buffer 608. In this manner, the phase relationship of CL1 and CL2 to the system clock is the same as the phase relationship of the data inputs to the clock in a master/slave divider (e.g., 6L1,6L2). This guarantees that the circuit will function properly to the same maximum frequency as the digital divider.

In the following discussion a reference to a clock means the system clock 750. The key to the use of select signals CL1, CL2, $\overline{CL1}$, and $\overline{CL2}$ as select inputs (S, $\overline{S}$) to the M-latches and F-latches is that they must have the same phase relationship to the clock as do the data inputs (e.g., D1, $\overline{D1}$). This requirement implies that the select inputs (S, $\overline{S}$) must be stable (i.e., at 0 or 1) when the latch is in the "Acquire" phase. Thus, CL1 is in its stable, latched state when the clock is high and is therefore used with latches that acquire when the clock is high (e.g., 6A2, 6A3, 6A4, 6C1). CL2 is stable when the clock is low and is used as a select control for 6C2 which acquires when the clock is low.

In the following description, consecutive bits of data from channel 1 input are denoted 1-1, 1-2, 1-3, etc., and from channel 2 are denoted 2-1, 2-2, 2-3, etc. and equivalently for channels 3 and 4.

New data is sampled or acquired simultaneously on all four channels by sampling means comprising 6C1, 6A2, 6A3, and 6A4 when the clock and the select inputs (CL1) are both high. Note that multiplexer latch 6C1 is utilized as part of the sampling means and as a multiplexer latch. Thus, at time 701, 6C1, 6A2, 6A3 and 6A4 have, respectively, bits 1-1, 2-1, 3-1, 4-1.

When the clock goes low at time 702, 6C1 transfers its channel 1 bit (1-1) to the multiplexer 6D1, and thence to the output. Concurrently therewith, 6C2 acquires the channel 2 bit (2-1) from 6A2 (CL2 is high at this time and therefore 6C2 has $D_1$ inputs active), and sampling latch 6B1 acquires the channel 3 bit (3-1) from 6A3.

When the clock goes high again at time 703, 6C2 latches the channel 2 bit (2-1) and 6D1 muxes it to the output. At time 703, 6A2, 6A3, and 6A4 are all in the "freeze" state during this clock phase (CL1 is now low), and therefore their previous logic states are retained. Meanwhile, 6C1 acquires the channel 3 bit (3-1) from 6B1.

When the clock again goes low at time 704, latches 6A2, 6A3 and 6A4 remain stable, 6C2 acquires the channel 4 bit (4-1) from 6A4, and 6D1 multiplexes the channel 3 bit (3-1) to the output from 6C1.

Finally, when the clock next goes high at time 705, latches 6A2, 6A3, 6A4 and 6C1 acquire a new data word (i.e., 1-2, 2-2, 3-2, 4-2). Concurrently, latch 6D1 is completing the transmission of the previous data word when it multiplexes the channel 4 bit (4-1) from 6C2. Thereafter, at time 706 the multiplexer starts a new operation cycle on the new data (1-2, 2-2, 3-2 and 4-2).

Note that the input latches 6A2, 6A3, 6A4 sample the input data for exactly 1 clock phase in every M clock phases, where M is the order of the multiplier.

While the present invention has been described in MUXs having a two- and a four-to-one multiplexing factors, it obviously can be utilized for other multiplexing factors of the form $2^N$ where N is any integer greater than zero. More generally, the present invention requires a 2:1 MUX as the rear-end MUX while the front-end MUX can utilize any multiplexing factor which does not violate the condition that the select signal to a latch be stable during the interval when that latch is in its "acquire" phase. Moreover, the number of phases of the select clock must be equal to the overall order of the multiplexer. Furthermore, additional levels of series gating within the latch will be helpful in realizing non-binary multiplexing factors. Thus, for example, a 6:1 MUX requires two front-end 3:1 MUXs. Realizing this 3:1 MUX design requires an extra level of series gating within the latches.

What has been described is merely illustrative of the application of the principles of the present invention. Other methods and circuits can be implemented by those skilled in the art without departing from the spirit and scope of the present invention.

What is claimed is:

1. A high output data rate M:1 multiplexer apparatus, where M is an even integer equal to or greater than four, said multiplexer apparatus comprising
   means for generating M select signals from multiple phases of a select clock having a frequency which is 2/M of the frequency of a system clock, said system clock signal frequency being equal to one-half of the multiplexer output data rate,
   a front-end multiplexer for multiplexing M input signals into two intermediate outputs, each of said M inputs selected for one of said intermediate outputs using a different combination of one or more of said select signals and phases of said system clock, and
   a rear-end multiplexer connected to said two intermediate outputs for providing a multiplexer apparatus output when clocked using said system clock.

2. A high output data rate $2^N$:1 (where N is an integer $\geq 2$) multiplexer apparatus comprising
   means for generating $2^N$ select signals from $2^N$ phases of a select clock having a frequency which is $1/2^{N-1}$ of the frequency of a system clock, said system clock frequency being equal to one-half of the output data rate,
   a front-end multiplexer including a plurality of 2:1 multiplexer latches interconnected to multiplex $2^N$ input signals into two intermediate outputs, each 2:1 multiplexer latch enabled by at least one of said select signals and clocked using said system clock, and
   a rear-end multiplexer connected to said two intermediate outputs for providing a multiplexer apparatus output when clocked using said system clock.

3. The multiplexer circuit of claim 2 wherein said front-end multiplexer includes
   sampling means for concurrently sampling each of said $2^N$ input signals enabled by one of said select signals and each sampling means clocked by the same phase of said clock,
   said input signal samples being multiplexed into said two intermediate outputs by said front-end multiplexer.

4. The multiplexer circuit of claim 3 wherein at least one of said plurality of 2:1 multiplexer latches connects directly to one of said $2^N$ input signals.

5. The multiplexer circuit of claim 4 wherein said generating means includes a master-slave D-type flip-flop circuit.

6. The multiplexer circuit of claim 3 wherein said front-end multiplexer further includes at least one latch means for delaying the processing of at least one of said $2^N$ input signals for at least one-half of the period of said system clock.

7. The multiplexer circuit of claim 2 wherein each of said 2:1 multiplexer latches includes means for logically ANDing said system clock and at least one of said select signals.

8. The multiplexer circuit of claim 3 wherein said sampling means includes a plurality of latching means, each latching means including means for logically ANDing one of said select signals and said system clock.

9. The multiplexer circuit of claim 3 further comprising
a first buffer means connected to each of said $2^N$ input leads for converting a received single polarity input signal into a differential input signal,
a second buffer means for converting said system clock to a differential clock signal, and
wherein said front-end multiplexer receives differential clock input signals, is responsive to said differential clock signals, and outputs differential output signals.

10. A high data rate 2:1 multiplexer circuit comprising
a first and second latching means for sampling data signals received over each of the two input leads during a first state of a system clock,
third latching means for latching the output data signal of said second latching means during a second state of said system clock,
multiplexer latching means for sampling the output data signal of said first latching means during said second state of said system clock and for sampling the output data signal of said third latching means during said first state of said system clock.

11. The multiplexer circuit of claim 10 further comprising
a first buffer means connected to each of said input leads for converting a received single polarity data signal into a differential data signal,
a second buffer means for converting said system clock into a differential system clock signal and
wherein said first, second and third latching means and said multiplexer latching means each samples differential data signals, each is responsive to said differential clock signals, and each outputs differential data signals.

12. A multiplexer apparatus comprising
buffer means for receiving and conditioning M input signals received from an external apparatus,
means for generating M select signals from multiple phases of a select clock having a frequency which is 2/M of the frequency of a system clock, said system clock signal frequency being equal to one-half of the multiplexer output data rate,
a front-end multiplexer for multiplexing said M input signals into two intermediate outputs, each of said M inputs sampled using both the same one of said select signals and the same phase of said system clock,
a rear-end multiplexer connected to said two intermediate outputs for providing a multiplexer apparatus output when clocked using said system clock, and
second buffer means for conditioning said multiplexer apparatus output for use by a second external apparatus.

13. The multiplexer apparatus of claim 12 wherein M is equal to $2^N$ where N is an integer equal to or greater than 2.

* * * * *